(12) United States Patent
Aberg et al.

(10) Patent No.: US 10,414,047 B2
(45) Date of Patent: Sep. 17, 2019

(54) METHOD AND A DATA PROCESSING SYSTEM FOR SIMULATING AND HANDLING OF ANTI-COLLISION MANAGEMENT FOR AN AREA OF A PRODUCTION PLANT

(71) Applicants: Per-Olof Aberg, Yngsjo (SE); Alexander Greenberg, Rehovot (IL); Moshe Schwimmer, Ramat-Gan (IL)

(72) Inventors: Per-Olof Aberg, Yngsjo (SE); Alexander Greenberg, Rehovot (IL); Moshe Schwimmer, Ramat-Gan (IL)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 0 days.

(21) Appl. No.: 14/868,159

(22) Filed: Sep. 28, 2015

(65) Prior Publication Data
US 2017/0087722 A1   Mar. 30, 2017

(51) Int. Cl.
*B25J 9/16* (2006.01)

(52) U.S. Cl.
CPC ........... *B25J 9/1676* (2013.01); *B25J 9/1697* (2013.01); *B25J 9/1666* (2013.01); *G05B 2219/40198* (2013.01); *G05B 2219/40202* (2013.01); *Y10S 901/47* (2013.01); *Y10S 901/49* (2013.01)

(58) Field of Classification Search
CPC ...... B25J 9/1666; B25J 9/1676; B25J 9/1697; G05B 19/4061; G05B 2219/40202; G05B 2219/40203; G05B 2219/40476

USPC .................................................. 700/253, 255
See application file for complete search history.

(56) References Cited

U.S. PATENT DOCUMENTS

| 8,154,590 | B2 | 4/2012 | Kressel | |
| 2011/0264266 | A1* | 10/2011 | Kock | B25J 9/1676 700/253 |
| 2014/0067121 | A1* | 3/2014 | Brooks | B25J 9/1676 700/255 |
| 2016/0031083 | A1* | 2/2016 | Embon | B25J 9/1676 700/255 |
| 2016/0075023 | A1* | 3/2016 | Sisbot | G06K 9/00348 700/255 |
| 2016/0346926 | A1* | 12/2016 | Matthias | B25J 9/1676 |

FOREIGN PATENT DOCUMENTS

| CN | 101511550 A | 8/2009 |
| CN | 102239032 A | 11/2011 |
| CN | 103894807 A | 7/2014 |
| WO | WO2014102018 A1 | 7/2014 |

* cited by examiner

*Primary Examiner* — Timothy R Waggoner
(74) *Attorney, Agent, or Firm* — Lempia Summerfield Katz LLC

(57) ABSTRACT

Methods and data processing systems for a simulation and handling of anti-collision management for an area of a production plant performed by a data processing system are provided. At least one robot performing robotic operations and at least one human performing human operations are at least partially operated simultaneously in the same area, and collision events are identified and remedied.

16 Claims, 3 Drawing Sheets

METHOD AND A DATA PROCESSING SYSTEM FOR SIMULATING AND HANDLING OF ANTI-COLLISION MANAGEMENT FOR AN AREA OF A PRODUCTION PLANT

TECHNICAL FIELD

The present disclosure is directed, in general, to computer-aided design, visualization, and manufacturing ("CAD") systems, product lifecycle management ("PLM") systems, product data management ("PDM") systems, and similar systems, that manage data for products and other items (collectively, "Product Data Management" systems or PDM systems).

BACKGROUND

In the planning of industrial processes, computer simulation techniques are used, where a physical scene of a physical environment is modeled by a virtual scene of a virtual simulation environment. The physical or real scene may, for example, be a facility, a manufacturing plant, an industrial scene, or any other physical scene that may benefit from being modeled in a virtual environment for industrial simulation purposes.

The real scene may include a variety of real objects that are related to a facility. Examples of real objects include, but are not limited to, equipment pieces, tools, containers, material pieces, finished or semi-finished products, and other objects present in the real scene. Real objects are represented in the virtual simulation environment by virtual objects. Virtual objects are typically defined through three-dimensional (3D) virtual models, examples of which include, but are not limited to, CAD models, CAD-like models, point cloud models, and other types of 3D computer models.

In the real scene, the real objects have a position and an orientation, which can change/move as the real object is moved or re-positioned within the real scene. When modeling industrial facilities in the virtual simulation environment, it is often a common requirement that the position and the orientation of the virtual objects in the virtual scene accurately reflect the position and the orientation of the real objects in the real scene.

It is assumed that light weight robots, which are designed to work around humans with no safety guards, are at a certain risk of hitting humans, such that safety mechanisms are provided to reduce any possible damage.

SUMMARY

It is difficult to design the environment and plan the process to reduce the risk that when the robot actually collides with the human, the damage from the impact will be kept to a minimum. The behavior of the human is not deterministic and often not exactly predefined, such that it is hard to accurately time the movement of the robot and the human so that all possible hits will be calculated. Therefore, improved techniques are desirable.

Various disclosed embodiments include simulation and handling methods and corresponding systems and computer-readable mediums. A method for simulating and handling of anti-collision management for an area of a production plant performed by a data processing system is disclosed. At least one robot performing robotic operations and at least one human performing human operations operate at least partially simultaneous in the area. The method includes analyzing the operations of the at least one robot in order to determine a robot sweeping area. The operations of the at least one human are also analyzed in order to determine a human sweeping area. A table that includes human body parts and a hit damage index related to the respective human body part is defined. Possible collision events are determined by comparing the robot sweeping area to the human sweeping area and generating a map of collision events. The map of collision events includes the sections of the robot sweeping area and the human sweeping area where the robot according to corresponding robotic operations and the human according to corresponding human operations are operating simultaneously. A collision damage map is calculated by associating the table with the map of collision events. The collision damage map displays the severity of a collision event among the robot and the human.

In another example, a data processing system is provided. The data processing system includes a processor and an accessible memory. The data processing system is configured to:

analyze operations of at least one robot in a production environment, thereby determining a robot sweeping area;

analyze operations of at least one human in the production environment, thereby determining a human sweeping area;

define a table including human body parts and a hit damage index related to the respective human body part;

determine possible collision events by comparing the robot sweeping area to the human sweeping area and generating a map of collision events, where the map of collision events includes the sections of the robot sweeping area and the human sweeping area where the robot according to corresponding robotic operations and the human according to corresponding human operations are operating simultaneously; and calculate a collision damage map by associating the table with the map of collision events, where the collision damage map displays the severity of a collision event among the robot and the human.

In another example, a non-transitory computer-readable medium is provided. The non-transitory computer-readable medium is encoded with executable instructions that, when executed, cause one or more data processing systems to:

analyze operations of at least one robot in a production environment, thereby determining a robot sweeping area;

analyze operations of at least one human in the production environment, thereby determining a human sweeping area;

define a table including human body parts and a hit damage index related to the respective human body part;

determine possible collision events by comparing the robot sweeping area to the human sweeping area and generating a map of collision events, where the map of collision events includes the sections of the robot sweeping area and the human sweeping area where the robot according to corresponding robotic operations and the human according to corresponding human operations are operating simultaneously; and calculate a collision damage map by associating the table with the map of collision events, the collision damage map displays the severity of a collision event among the robot and the human.

The foregoing has outlined rather broadly the features and technical advantages of the present disclosure so that those skilled in the art may better understand the detailed description that follows. Additional features and advantages of the disclosure that form the subject of the claims will be described hereinafter. Those skilled in the art will appreciate that the conception and the specific embodiment disclosed may be readily used as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, are inclusion without limitation; the term "or" is inclusive, being and/or; the phrases "associated with" and "associated therewith," as well as derivatives thereof, may be to include, be included within, interconnect with, contain, be contained within, connect to or with, couple to or with, be communicable with, cooperate with, interleave, juxtapose, be proximate to, be bound to or with, have, have a property of, or the like; and the term "controller" is any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques for a proper handling of anti-collision management for an area of a production plant were based on an on-site analysis where robots are taken to the shop floor and production engineers tried to visually assess operations of the robot in order to figure out whether a robot may hit a human during the course of operations. This analysis is cumbersome, tedious, error-prone, and otherwise ill-suited for the task of avoiding damage to humans operating with robots within the same production area.

Embodiments according to the present disclosure provide numerous benefits including, but not limited to providing a user-friendly manner for simulating the collision management systematically by checking the robotic path and the human interactions in the area of the robot. Further, the production process involving robot operations and human operations within the same area of a production plant can be planned systematically, thereby avoiding collisions at least partially while or for performing modification of the production process within the simulation environment. Another benefit includes enabling a user-friendly control of the position and of the orientation of the operations of the robot and the human in an intuitive manner so that the industrial simulation and planning is an accurate simulation of the real world process. A benefit also includes facilitating, for non-expert users, the usage of industrial simulation packages (e.g., Process Simulate and Human Simulation provided by Siemens Product Lifecycle Management Software Inc. (Plano, Tex.)) on a shop floor to execute the virtual simulation for ongoing production simulation.

Embodiments may be particularly beneficial for software packages that incorporate CAD environments, including, but not limited to, NX, Process Simulate, Solid Edge, and others provided by Siemens Product Lifecycle Management Software Inc. (Plano, Tex.) or packages offered by other software suppliers. Embodiments combined with a CAD system may conveniently supply a complete design and simulation environment.

Figure 1:
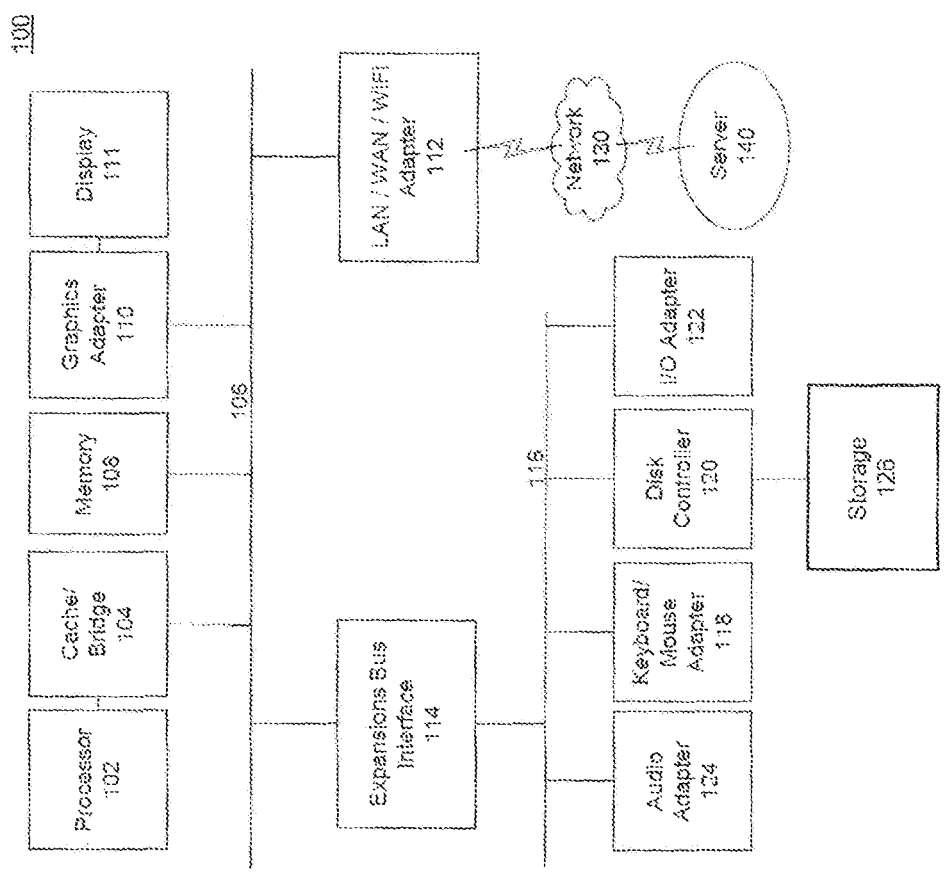
FIG. 1 illustrates a block diagram of a data processing system in which an embodiment can be implemented.

FIG. 1 illustrates a block diagram of a data processing system 100 in which an embodiment can be implemented, for example, as a PDM system particularly configured by software or otherwise to perform the processes as described herein, and, for example, as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to the local system bus in the illustrated example are a main memory 108 and a graphics adapter 110. The graphics adapter 110 may be connected to display 111.

Other peripherals, such as local area network (LAN)/Wide Area Network/Wireless (e.g., WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash., may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
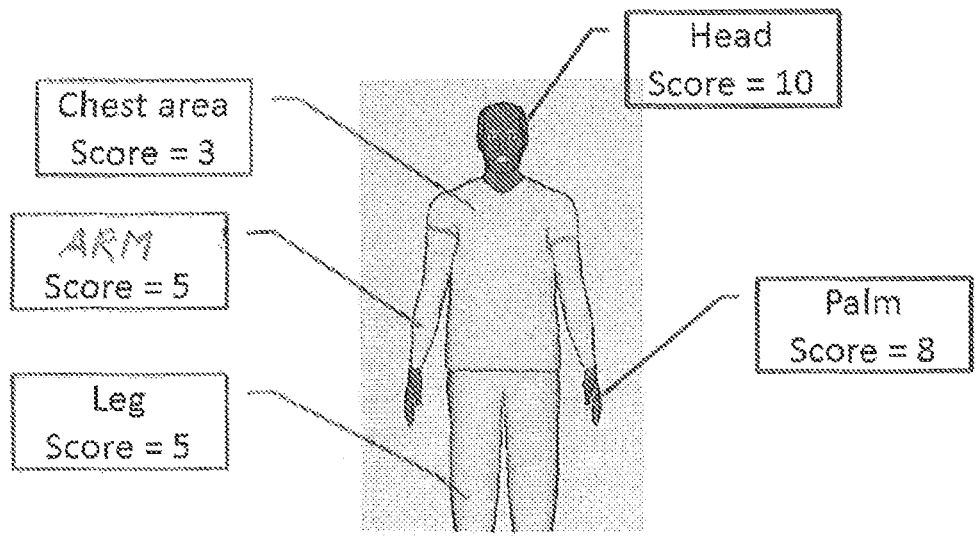
FIG. 2 illustrates a schematic view of a relationship of body parts and a collision hit index.

FIG. 2 illustrates a schematic view of a relationship of body parts and a collision hit index in accordance with disclosed example embodiments. In this embodiment, the possible values for the collision hit index range from 0 to 10, where the head of a human operator is assigned the highest collision hit index of 10. The palm of a human operator has an assigned collision hit index of 8. The arms and the legs of the human operator have a collision hit index of 5, while the chest area has the lowest collision hit index of 3 in this example. The collision hit index represents an indication for the weighing factor when determining the severity of a collision event of a robot with the respective part of the human operator. The values for the collision hit index can be present in the form of a table including the body part and the respective collision hit index. The number is not limited, and additional number/areas of the body can be utilized as well as other weighting factors.

Figure 3:
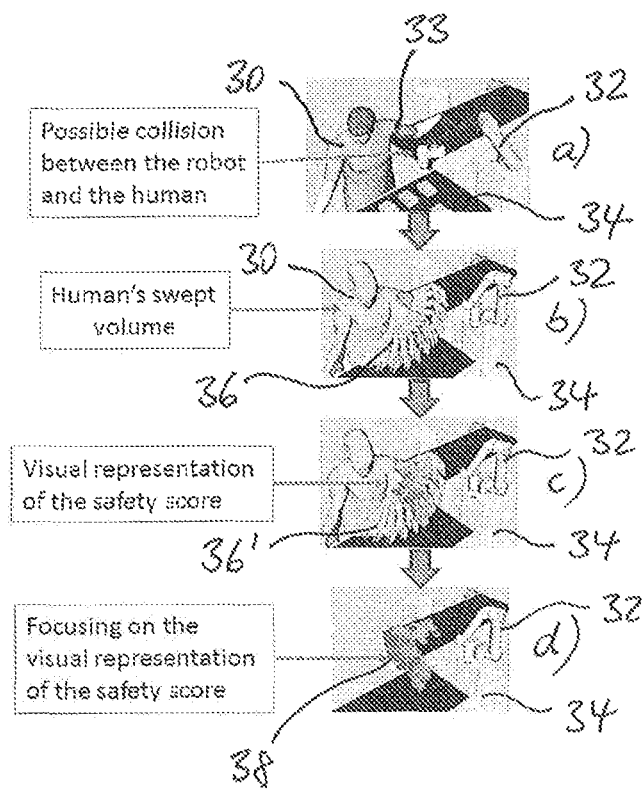
FIG. 3 illustrates a schematic view of a robot sweep area and a human sweep area in a production environment, where within the robot sweep area and the human sweep area a collision event occurs.

FIG. 3 illustrates an exemplary embodiment where a collision event is likely to occur. Part a) represents a situation where a human 30 operates simultaneously together with a robot 32 in a production area 34 of a production facility (not shown). Part b) represents the determination of a human sweep area 36 (e.g., volume) being illustrated by the various positions the left arm 33 of the human 30 will most probably sweep during the production operation of the human (e.g., grabbing a part, mounting a part, assembling a part in cooperation with the robot and the like). As an operation of the human, it would also be included to have the human just being positioned at a certain point in the area or to have the human just walking around in the area. Part c) represents the visual representation of the safety score either in the form of a 2D or 3D collision damage map. This collision damage map 36' can represent, for example, the collision event being weighed with the collision hit index for the respective body part of the human operator 30 (e.g., the left arm with a collision hit index of 5). Part d) illustrates the abstracted collision damage map 38, where only the areas (e.g., volumes) that exceed a certain threshold for the severity of the collision event can be displayed.

When running a simulation of a mixed environment of a production area in which a human and a robot will operate simultaneously, a number of different parameters can be observed, such as:

a) Considering that the mixed environment includes CAD models that are available for the data processing system. The CAD models can be generated from mechanical scans, Point cloud and manually modeled;

b) Considering the CAD model of the robot is available in the data processing system; c) Considering the model of the human and the collision hit index table to the data processing system;

d) the industrial production process that represents the actions/operations of the robot can be planned;

e) the operations of the human can be planned or predicted in the same environment;

f) a swept volume of each body part of the human can be determined, which represents all the places and positions that the human will be present during the production process;

g) the simulation can be run and all the collision events between the swept volume of the robot and the swept volume of the human can be tracked;

h) optionally, the speed of the specific part of the robot while hitting the swept volume of the human can be considered;

i) based on the path and velocity of the robot's parts (e.g., the impact angle) and the body part that will be hit during the collision event, the impact value that represents the "Safety Score" for that specific production area can be calculated. As mentioned above, the "Safety Score" can be provided as a 2D or 3D collision damage map representing the potential severity of an injury, in case there is one, for the human caused through the collision event;

j) a high score can represent, for example, a potential severe injury. The score can be calculated in different ways. For example: $Rs^2+Bp^2=S$, where $Rs \in \mathbb{R}$ is the robot's speed, $Bp \in \{1, \ldots, 10\}$ is the collision hit index, and $S \in \mathbb{R}$ is the Safety Score, where the collision hit index represents the sensitivity of the body part for a robot hit.

In addition, different models of different humans with different body types can be simulated in parallel, so that the Safety Score for one area will be the maximum score that was calculated for different humans and/or robots.

The collision damage map (e.g., the safety score map) can be visually presented in the 3D computer environment by coloring/animation of that area/volume in an appropriate color that represents the score. The collision damage map can, for example, indicate the severity of a damage such as in a heat map, where redder colors indicate potentially more severe damage and greener colors indicate a potentially less damaging strike, etc.

Consequentially, the operation program for the robot and/or the operation program for the human can be changed so that the safety score and the associated color will change, and the respective environment is then displayed a safer area. For example, this can be achieved by reducing the speed of the robot in areas in which the safety score shows that the area is not safe yet or is above a pre-defined threshold for the severity of the collision event.

The embodiments disclosed provide reliable methods to check the robotic sweep area and human interaction simultaneously in the same production area. Disclosed embodiments help verify that the industrial process is safe without the use of cumbersome, time consuming, and error-prone tests that fail to accurately reflect the position and speed of the movements of the robot and the human during the production process.

The embodiments disclosed provide reliable methods for robotic engineers to design an activity of the robot in close proximity to human activities, as is often required in common industrial environments. The combination of precise human activity based on ergonomic behavior and identification of body parts with a precise robotic path provides for an accurate simulation of the industrial environment to minimize the risk of a human being injured.

Optionally, embodiments may further include that 3D environment models that define the constraints and object of activities for robots and humans, as well as the precise simulation of robot motion, the path, and various elements of arms, manipulators, combined with target parts (in case of pick-and-place/handling robots), can be utilized in some embodiments to identify the precise trajectory and speed of rigid bodies in the space. This results in reliable, ergonomic, and anatomical correct human body simulation that predicts the precise movement and trajectory of various parts. Some embodiments further identify and score human body parts for severity of potential injury, based on the impact conditions (e.g., force, angle, speed, body part, collision hit index).

The combination of the kinematic simulation behavior with a visual dynamic mapping of zones with severity factor provides numerous benefits for industrial production planning Some embodiments utilize the collision damage maps 38 for static analysis of hazards or for identifying motion of objects through such zones. Some embodiments provide such information dynamically to robotic/ergonomic engineers to allow a continuous modification of the path/position/movements enabling more efficient planning due to continues feedback.

Optionally, an upper threshold for the severity of a collision event can be defined, and a warning attribute can be assigned to those collision events exceeding the upper threshold. In addition, for collision events receiving a warning attribute, the robot operations and/or the human operations involved are identified, and the order of the robot operations and/or the human operations involved are rescheduled in order to remove those collision events or lower the collision impact below the upper threshold. Further, for collision events receiving a warning attribute, the robot operations and/or the human operations involved are identified, and the execution of the robot operations and/or the human operations involved are amended (e.g., by lowering accelerations values for the robot operations). Other ways to lower the collision impact are also possible.

It is also possible determine the speed of the robot or a specific part of the robot during a collision event. This measure can be used advantageously when the severity of a collision event is calculated using the speed of the robot or a specific part of the robot and the hit damage index of the respective human body part most probably hit during the collision event.

In order to receive a precise knowledge on the dynamic roll-out of the production process, the robot sweeping area is a timely structured robot sweeping area. In other words, the collision event determination can be further based on the development of the robot sweeping area with the time. Similarly, the human sweeping area can be determined as a timely structured human sweeping area. Both the timely structured robot sweeping area and the timely structured human sweeping area can then be compared during the course of time. Collision event can now be more precise determined with the additional dimension of the time.

Figure 4:
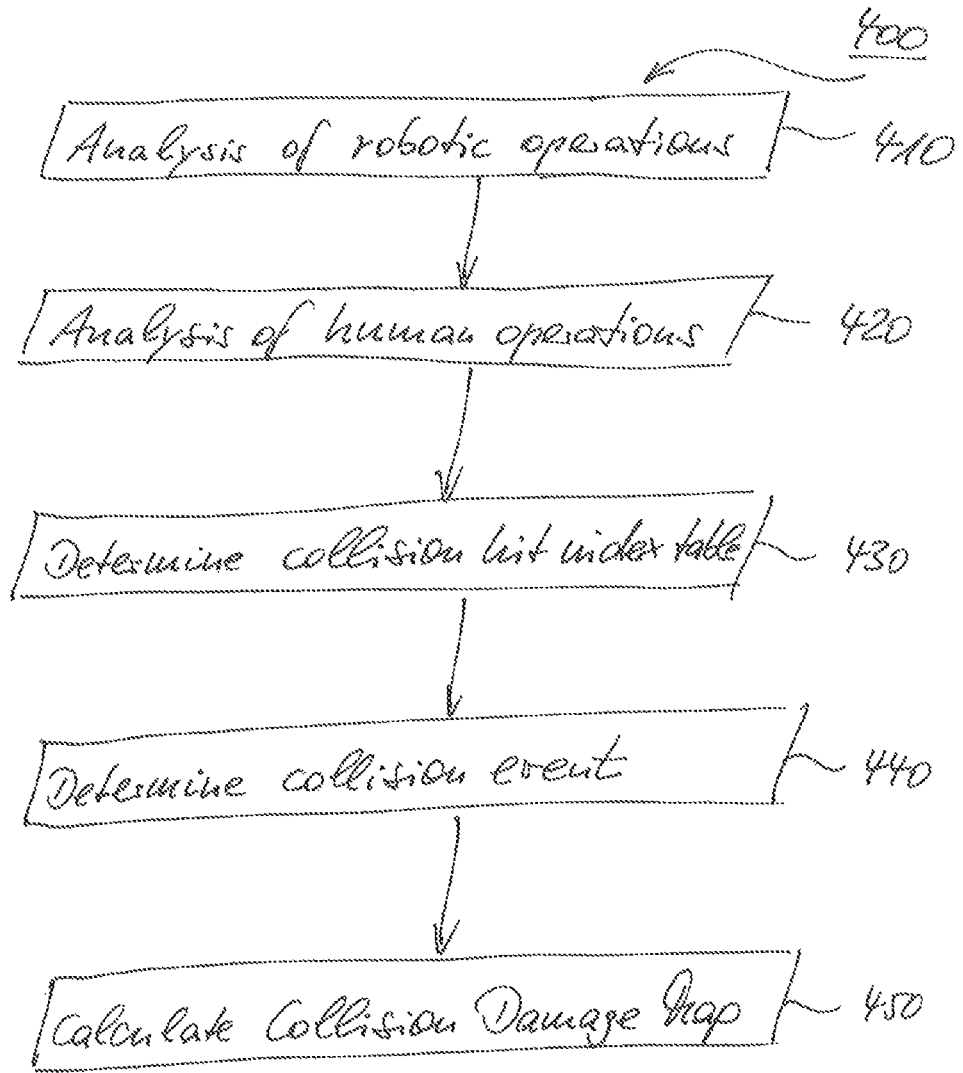
FIG. 4 illustrates a flowchart of a process for simulating and handling of anti-collision management for an area of a production plant in accordance with disclosed embodiments.

FIG. 4 illustrates a flowchart 400 of a method for simulating and handling of anti-collision management for an area of a production plant performed by a data processing system. At least one robot performing robotic operations and at least one human performing human operations operate at least partially simultaneous in the area.

At act 410 of the method, the operations of the robot in the area are analyzed, thereby determining a robot sweeping area.

At act 420, the operations of the human in the area are analyzed, thereby determining a human sweeping area.

At act 430, a table including human body parts and a hit damage index related to the respective human body part is defined.

At act 440, possible collision events are determined by comparing the robot sweeping area to the human sweeping area and generating a map of collision events. The map of collision events comprises those sections of the robot sweeping area and the human sweeping area where the robot according to its robotic operations and the human according to its human operations are operating simultaneously. As a human operation, it is also included to have the human just being positioned at a certain point in the area or to have the human just walking around in the area, i.e. for fetching a part to assemble or the like.

At act 450 a collision damage map is generated by associating said table with said map of collision events; said collision damage map displaying the severity of a collision event among the robot and the human.

One or more of the processor 102, the memory 108, and the simulation program running on the processor 102 receive the inputs via one or more of the local system bus 106, the adapter 112, the network 130, the server 140, the interface 114, the I/O bus 116, the disk controller 120, the storage 126, and so on. Receiving, as used herein, can include retrieving from storage 126, receiving from another device or process, receiving via an interaction with a user, or otherwise.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element that must be included in the claim scope: the scope of patented subject matter is defined only by the allowed claims.

What is claimed is:

1. A method for simulating and handling anti-collision management for an area of a production plant performed by a data processing system, wherein at least one simulated robot performing robotic operations and at least one simulated human performing human operations operate at least partially simultaneous in the area, the method comprising:
    generating, by a processor of the data processing system, simulated operations of the at least one simulated robot;
    determining, by the processor, a robot sweeping area, the determining of the robot sweeping area comprising analyzing the simulated operations of the at least one simulated robot;
    generating, by the processor, simulated operations of the at least one simulated human;
    determining, by the processor, a human sweeping area, the determining of the human sweeping area comprising analyzing the simulated operations of the at least one simulated human;
    defining a table comprising human body parts and a hit damage index related to the respective human body part;
    determining, by the processor, possible collision events, the determining of the possible collision events comprising comparing the robot sweeping area to the human sweeping area, determining a specific human body part most probably hit during collision events based on the comparison of the robot sweeping area to the human sweeping area, and generating a map of collision events, wherein the map of collision events comprises sections of the robot sweeping area and the human sweeping area where the at least one simulated robot, according to the generated robotic operations, and the at least one simulated human, according to the generated human operations are operating simultaneously;
    calculating, by the processor, a collision damage map, the calculating of the collision damage map comprising associating the table with the map of collision events, the collision damage map displaying a severity of a collision event among the at least one simulated robot and the at least one simulated human;
    defining an upper threshold for the severity of the collision event;
    identifying, for collision events exceeding the upper threshold, robot operations involved, human operations involved, or the robot operations involved and the human operations involved; and
    changing an order of the robot operations involved, the human operations involved, or the robot operations involved and the human operations involved.

2. The method of claim 1, wherein the collision damage map is weighted with the hit damage index of the specific human body part most probably hit during the collision event.

3. The method of claim 1, further comprising assigning a warning attribute to the collision events exceeding the upper threshold.

4. The method of claim 3, further comprising:
    identifying, for collision events receiving the warming attribute, the robot operations involved, the human operations involved, or the robot operations involved and the human operations involved; and
    amending execution of the robot operations involved, the human operations involved, or the robot operations involved and the human operations involved.

5. The method of claim 1, further comprising determining a speed of the at least one simulated robot or a specific part of the at least one simulated robot during the collision event.

6. The method of claim 5, further comprising calculating the severity of the collision event using the speed of the at least one simulated robot or the specific part of the robot, and the hit damage index of the respective human body part most probably hit during the collision event.

7. The method of claim 1, wherein the robot sweeping area is a timely structured robot sweeping area.

8. The method of claim 1, wherein the human sweeping area is a timely structured human sweeping area.

9. The method of claim 1, wherein comparing the robot sweeping area to the human sweeping area and generating a map of collision events further comprises comparing the robot sweeping area to the human sweeping area on the basis of time and generating the map of collision events including a dimension of time.

10. A data processing system comprising:
    a processor; and
    an accessible memory in communication with the processor, the processor configured to:
        generate simulated operations of at least one simulated robot;
        determine a robot sweeping area, the determination of the robot sweeping area comprising an analysis of the simulated operations of the at least one robot in a simulated production environment;
        generate simulated operations of at least one simulated human;
        determine a human sweeping area, the determination of the human sweeping area comprising an analysis of the simulated operations of the at least one human in the simulated production environment;
        define a table comprising human body parts and a hit damage index related to the respective human body part;
        determine possible collision events, the determination of the possible collision events comprising a comparison of the robot sweeping area to the human sweeping area, determination of a specific human body part most probably hit during collision events based on the comparison of the robot sweeping area to the human sweeping area, and generation of a map of collision events, wherein the map of collision events comprises sections of the robot sweeping area and the human sweeping area where the at least one simulated robot, according to the generated robotic operations, and the at least one simulated human, according to the generated human operations, are operating simultaneously;
calculate a collision damage map, the calculation of the collision damage map comprising association of the table with the map of collision events, the collision damage map displaying a severity of a collision event among the at least one simulated robot and the at least one simulated human;
define an upper threshold for the severity of the collision event;
identify, for collision events exceeding the upper threshold, robot operations involved, human operations involved, or the robot operations involved and the human operations involved; and
change an order of the robot operations involved, the human operations involved, or the robot operations involved and the human operations involved.

11. The data processing system of claim 10, wherein the collision damage map is weighted with the hit damage index of the specific human body part most probably hit during the collision event.

12. The data processing system of claim 10, wherein the processor is further configured to assign a warning attribute to the collision events exceeding the upper threshold.

13. The data processing system of claim 12, wherein the processor is further configured to:
identify, for collision events receiving the warning attribute, the robot operations involved, the human operations involved, or the robot operations involved and the human operations involved; and
amend an execution of the robot operations involved, the human operations involved, or the robot operations involved and the human operations involved, the amendment of the execution of the robot operations comprising lowering acceleration values for the robot operations.

14. A non-transitory computer-readable medium encoded with executable instructions that, when executed, cause one or more data processing systems to:
generate simulated operations of at least one simulated robot;
determine a robot sweeping area, the determination of the robot sweeping area comprising analysis of the simulated operations of the at least one simulated robot in a simulated production environment;
generate simulated operations of at least one simulated human;
determine a human sweeping area, the determination of the human sweeping area comprising analysis of the simulated operations of the at least one simulated human in the production environment;
define a table comprising human body parts and a hit damage index related to the respective human body part;
determine possible collision events, the determination of the possible collision events comprising comparison of the robot sweeping area to the human sweeping area, determination of a specific human body part most probably hit during collision events based on the comparison of the robot sweeping area to the human sweeping area, and generation of a map of collision events, wherein the map of collision events comprises sections of the robot sweeping area and the human sweeping area where the at least one simulated robot, according to the generated robotic operations, and the at least one simulated human, according to the generated human operations, are operating simultaneously;
calculate a collision damage map, the calculation of the collision damage map comprising association of the table with the map of collision events, the collision damage map displaying a severity of a collision event among the at least one simulated robot and the at least one simulated human;
define an upper threshold for the severity of the collision event;
identify, for collision events exceeding the upper threshold, robot operations involved, human operations involved, or the robot operations involved and the human operations involved; and
change an order of the robot operations involved, the human operations involved, or the robot operations involved and the human operations involved.

15. The non-transitory computer-readable medium of claim 14, wherein the collision damage map is weighted with a hit damage index of the specific human body part most probably hit during the collision event.

16. The non-transitory computer-readable medium of claim 14, wherein the executable instructions, when executed, cause the one or more data processing systems to assign a warning attribute to the collision events exceeding the upper threshold.

* * * * *